United States Patent
Dousse et al.

(10) Patent No.: US 8,812,416 B2
(45) Date of Patent: Aug. 19, 2014

(54) PREDICTIVE SERVICE FOR THIRD PARTY APPLICATION DEVELOPERS

(75) Inventors: Olivier Dousse, Lausanne (CH); Juha K. Laurila, St-Legier (CH); Taneli Mielikainen, Menlo Park, CA (US); Nikolai Nefedov, Gattikon (CH)

(73) Assignee: Nokia Corporation, Espoo (FI)

( * ) Notice: Subject to any disclaimer, the term of this patent is extended or adjusted under 35 U.S.C. 154(b) by 312 days.

(21) Appl. No.: 13/291,666

(22) Filed: Nov. 8, 2011

(65) Prior Publication Data

US 2013/0117208 A1 May 9, 2013

(51) Int. Cl.
*G06F 15/18* (2006.01)

(52) U.S. Cl.
USPC ........................................................ 706/21

(58) Field of Classification Search
CPC .... G06N 99/005; G06N 7/005; G06F 17/246; G06F 9/44505; G06Q 30/0202
USPC ................................................ 706/11, 12, 21
See application file for complete search history.

(56) References Cited

U.S. PATENT DOCUMENTS

| | | | |
|---|---|---|---|
| 7,783,622 B1 | 8/2010 | Vandermolen et al. | 707/708 |
| 8,229,864 B1 * | 7/2012 | Lin et al. | 706/11 |
| 8,364,613 B1 * | 1/2013 | Lin et al. | 706/12 |
| 8,521,664 B1 * | 8/2013 | Lin et al. | 706/12 |
| 2004/0034652 A1 | 2/2004 | Hofmann et al. | 707/102 |
| 2009/0016471 A1 * | 1/2009 | Rajagopal | 375/346 |
| 2009/0024452 A1 * | 1/2009 | Martinez et al. | 705/10 |
| 2009/0210475 A1 | 8/2009 | Gadanho et al. | 709/201 |
| 2009/0298480 A1 * | 12/2009 | Khambete et al. | 455/414.1 |
| 2009/0299945 A1 * | 12/2009 | Hangartner | 706/50 |
| 2010/0235877 A1 | 9/2010 | Hu et al. | 726/1 |
| 2010/0318576 A1 * | 12/2010 | Kim | 707/802 |
| 2011/0014972 A1 * | 1/2011 | Herrmann et al. | 463/25 |
| 2011/0219419 A1 * | 9/2011 | Reisman | 725/112 |

OTHER PUBLICATIONS http://code.google.com/apis/predict/, "What is the Google Prediction API?", (2011), (2 pages). "Featured Video" available Upon Request.

* cited by examiner

*Primary Examiner* — Li-Wu Chang
*Assistant Examiner* — Dave Misir
(74) *Attorney, Agent, or Firm* — Harrington & Smith

(57) ABSTRACT

Disclosed is an apparatus, method and computer program device which send a prediction request to a prediction service to construct a prediction result, receives a prediction result and an estimation of accuracy of the prediction result from the prediction service and configures an application to adapt to at least one of user preferences, behavior and habits based upon the prediction result and estimation of accuracy of the prediction result. The prediction service can include an over-the-air server which is coupled to a prediction server or a dedicated API residing on one or more user devices and configured to access a prediction server.

19 Claims, 7 Drawing Sheets

PREDICTIVE SERVICE FOR THIRD PARTY APPLICATION DEVELOPERS

TECHNICAL FIELD

The exemplary and non-limiting embodiments of this invention relate generally to wireless communication systems, methods, devices and computer programs and, more specifically, relate to allowing third party application developers to tailor their applications adaptively to user preferences, behavior and habits.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Currently, third party application developers who develop applications for mobile electronic devices have a limited ability to collect information on potential users of their application. Such information would be beneficial to third party developer, a mobile platform provider, a mobile content provider as well as the mobile user. However, users and mobile platform provider have legitimate privacy concerns with respect to the release of this information. Accordingly, there is a need to allow third party application developer's access to information on potential users which would protect the privacy of users yet would allow developers to tailor their applications adaptively to user preferences, behavior and habits.

SUMMARY

The foregoing and other problems are overcome, and other advantages are realized, by the use of the exemplary embodiments of this invention.

In a first aspect thereof the exemplary embodiments of this invention provide a method comprising sending an prediction request to a prediction service to construct a prediction result receiving a prediction result and an estimation of accuracy of the prediction result and configuring an application to adapt to at least one of user preferences, behavior and habits based upon the prediction result and estimation of accuracy of the prediction result.

In accordance with another aspect of the invention, the method comprises the further steps of sending a prediction usage request to the prediction service to construct a prediction usage result receiving a prediction usage result and an estimation of accuracy of the prediction usage result and configuring the application to adapt to the user preferences, behavior and habits based upon the prediction usage result and estimation of accuracy of the prediction usage result.

In accordance with another aspect of the invention, the method comprises the further steps of sending a prediction update request to the prediction service to construct a prediction usage result receiving a prediction update result and an estimation of accuracy of the prediction update result and configuring the application to adapt to the user preferences, behavior and habits based upon the prediction update result and estimation of accuracy of the prediction update result.

In accordance with another aspect of the invention, an apparatus is provided including a processor and a memory including computer program code where the memory and computer program code are configured to with the processor cause the apparatus at least to send an prediction request to a prediction service to construct a prediction result receive a prediction result and an estimation of accuracy of the prediction result and configure an application to adapt to at least one of user preferences, behavior and habits based upon the prediction result and estimation of accuracy of the prediction result.

In accordance with another aspect of the invention, the prediction service can include an over-the-air server which is coupled to a prediction server or a dedicated API residing on one or more user devices and configured to access a prediction server.

BRIEF DESCRIPTION OF THE DRAWINGS

The foregoing and other aspects of the exemplary embodiments of this invention are made more evident in the following Detailed Description, when read in conjunction with the attached Drawing Figures, wherein.

DETAILED DESCRIPTION

Figure 1:
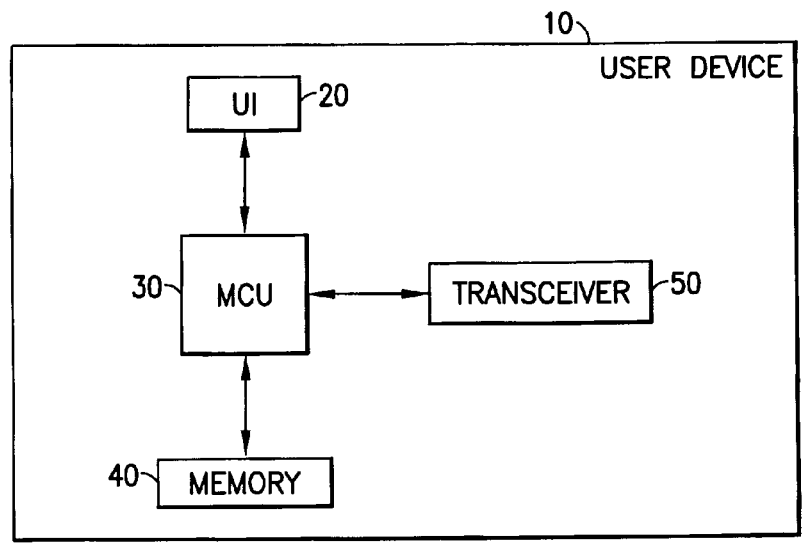
FIG. 1 is a simplified block diagram of a user device configured to allow third party application developers to tailor their applications adaptively to user preferences, behavior and habits, according to one possible exemplary embodiment of the present invention.

The exemplary embodiments of this invention provide apparatus, methods, and computer program(s) that allow third party application developers to tailor their applications adaptively to user preferences, behavior and habits.

As considered herein a mobile ecosystem includes a set of actors who come together to deliver products and services to owners of user devices (e.g. users of smart phones, tablets and portable computers). The key actors in a mobile ecosystem are mobile platform providers, mobile ecosystem contributors, third party application developers and users. Chief among the influences which contribute to the growth of a mobile ecosystem is the development of interchangeable yet complementary applications. Growth in applications therefore results in an enhance experience amongst users of user devices. One way to facilitate this growth is to define an application programming interface (API). An API is the particularized set of code and specifications that software programs follow to allow communication with a user device's platform and a mobile network. Also, as the name implies, an API serves as an interface between different software programs and facilitates their interaction between the platform, the mobile network and the user device. As such, an API, from the user's perspective, provides an interface which is familiar (and therefore easy to use).

When creating new applications (or modifying existing applications), third party applications developers employ an API through knowledge of the particularized vocabularies and resource request conventions (e.g. function-calling conventions). In light of this, developers require information regarding the API's specifications for routines, data structures, object classes, and protocols used to communicate between the particular software program, platform and user of the mobile device.

Also, when creating applications and later marketing them, third party applications developers seek to tailor their applications adaptively to user preferences, behavior and habits. Tailoring applications supports retention of users (e.g. potential customers) which is critical in the early phases of application usage. The traditional methods of obtaining this user information is to collect it from the user within the application itself or to collect it independently. For example, when the user first opens the application he or she can be prompted to fill out dialog forms which are used to adapt the application experience accordingly. Alternatively, prior to downloading the application, a user is required to manually input answers to a questionnaire. These methods are not only time consuming but can, and often are, avoided by users who find the processes burdensome, or an invasion of their privacy rights. Such users can, for example, simply cancel out the dialog form, or provide incomplete or null answers to the questionnaires. Another conventional method for collecting information regarding users provides a monitoring function (in lieu of the dialog form or manual questionnaire) which collects detailed usage information specific to the user's application history to build a user profile. This method also is time consuming as it takes time to collect adequate history information relating to the user's use of the application.

Another conventional method for collecting information regarding users involves a so-called "cloudified" solution which requires uploading data content and user preferences to a predictive API server that employ a machine learning algorithm. The machine learning algorithm analyzes a user' historic data with respect to data content specific to an application and predict likely future outcomes. However, the problem with this method is that the mobile platform providers or mobile ecosystem contributor sacrifices control over the data content as well as end user privacy.

As mentioned above, mobile platform vendors and mobile ecosystem contributors (e.g., mobile device/solution providers) accumulate significant data assets related to their users' preferences, behavior and habits. These data assets can be located in the servers of the mobile platform vendor or those of an ecosystem contributor. Alternatively, the data assets can be partially saved in a distributed manner in the electronic devices carried by the users. In general, such data assets include raw data elements such as user-specific clicks related to service usage, search terms, detailed location-time pairs, and/or connection logs. Also, the raw data elements can include sensitive personal information (e.g., name, address, and other identifying information) which the typical user would not reveal to third parties such as third party application developers. Although not desirable, other embodiments of the present invention can utilize raw data including sensitive personal information.

Access to the data assets mentioned above would benefit third party application developers and ultimately the end users of the applications. In particular, allowing the third party application developer access to this raw data would allow for an immediate personalization/adaptation of a new application which would improve the user's experience. In other words, the initial training period required to train a new user on an application would be reduced because the program would be tailored the user's preferences, behavior and habits. In addition, the personalization could support retention of users or customers, which is critical in the early phases of application usage. For example, such personalization could help prevent user frustration which could result in users limiting their use of, or even abandoning, a particular application.

According to one or more embodiments of the present invention, these data assets are linked to usernames given by the mobile platform vendor or ecosystem contributor. To protect the user's privacy the data assets do not contain sensitive personal information. These data assets converge with other data to form a "universal profile vector" (UPV). The other data include a training set and calculation configuration instructions (prediction type) to designate the type of prediction calculation to be performed on the data assets. Initially, the UPV contains only a subset of usernames linked to detailed application data usage called an "active set of users" (or training set) and the prediction type. The subset of usernames can be obtained from a beta release of the application or from a group of usernames affiliated with a similar software type. The UPV is subjected to statistical analysis by a prediction server which performs prediction tasks (e.g. relevance calculations) to construct and initially train a predictor for a particular third party application. A prediction server can be maintained by any wireless ecosystem actor or by an independent vendor. Hence, the predictor is the extrapolated data output from the prediction server which is used by third party application developers to tailor their applications adaptively to user preferences, behavior and habits. After a predictor is created, additional usernames can be added to the predictor to improve accuracy, thereby creating an updated (and more useful) predictor. Additionally, once the third party application is released, new users can update the third party application installed on their user devices via an application program interface API which connects the users' devices to the predictive server. This disclosure provides several non-limiting examples of apparatus, methods and computer programs implemented in mobile devices and/or wireless networks. Other embodiments are possible, such additional non-limiting examples may also include implementation in conjunction with a computer application (e.g. a "plug-in") and/or an enhancement to internet service (e.g. configuration of a set top box or cable/DSL modem to user preferences) or any other way a consumer can interact or provide electronic data to providers of a prediction service, both for data collection and usage of the prediction service.

FIG. 1 is a simplified block diagram of a user device (or user equipment, or user terminal) configured to allow third party application developers to tailor their applications adaptively to user preferences, behavior and habits, according to one possible exemplary embodiment of the present invention. The user device 10 may be any portable device having wireless communication such as, but not limited to, a smart phone, a tablet, or a portable computer. Moreover, this and other embodiments of the present invention can be implemented in conjunction with a computer application or an internet service (e.g. contained in hardware/software in a set-top box). Additionally, this and other embodiments of the present invention can be any other means of interacting with a consumer to provide data to a provider of a predictive service, both for data collection and usage of the service. The user device includes at least one controller 30 which can be, but is not limited to, a microcontroller, a digital signal processor, or a field programmable gate array (FPGA). The controller 30 is connected to at least one memory 40 which is suitable for storing the user device's operating system as well as various software programs. A transceiver 50 allows the user device 10 to communicate on a wireless communication network which can be, as non-limiting examples, a WLAN, WCDMA/LTE, UWB/60 GHz, UTRAN, GSM, Bluetooth (BT) LAN, or any other network. A user interface 20 allows a user to interact with the user device and its various software programs. Non-limiting examples of such a user interface 20 include a display, keyboard, pointing device, and/or touch screen.

Figure 2:
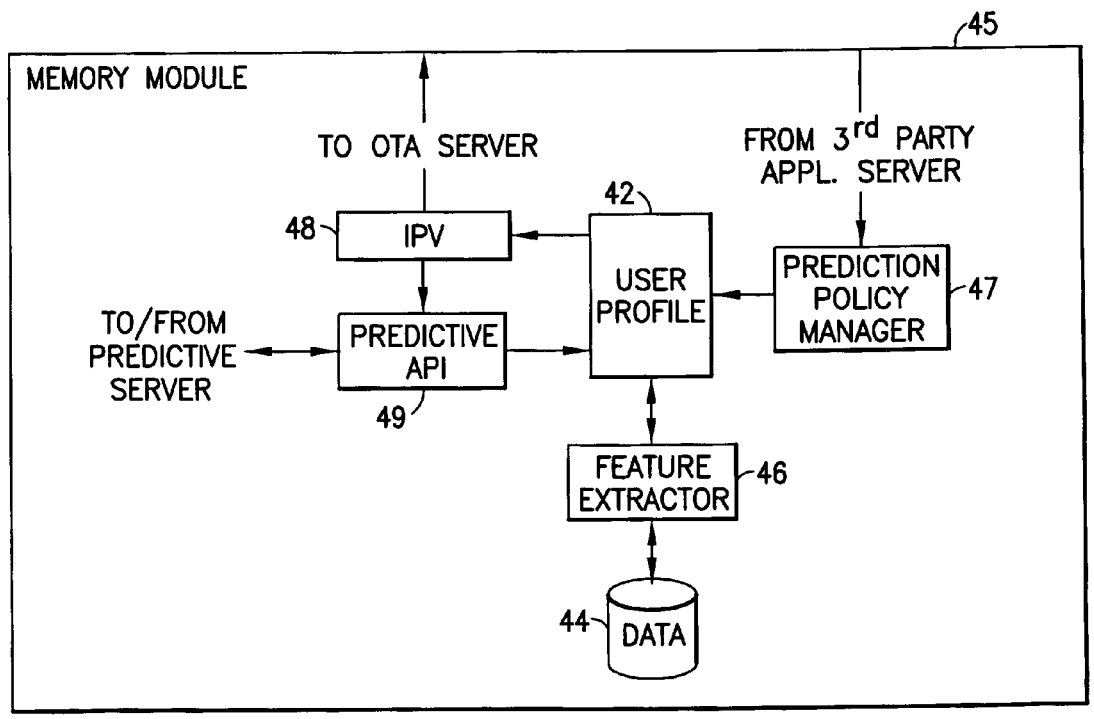
FIG. 2 is a block diagram of a memory module including software capable of allowing third party application developers to tailor their applications adaptively to user preferences, behavior and habits, according to one possible exemplary embodiment of the present invention.

FIG. 2 is a block diagram of a memory module 45 of memory 40 shown in FIG. 1 including a software program which together with the controller 30 is capable of carrying out program instructions to allow third party application developers to tailor their applications adaptively to user preferences, behavior and habits. A user profile 42 is created in memory 40 and contains personal information about the user including information related to a user's particular behavior, habits and/or preferences. Feature extractor 46 is coupled to user profile 42 and data 44. The user profile 42 is coupled to a predictive policy manager 47 and an individual provide vector (IPV) 48 and predictive application program interface (API) 49. A feature as used throughout this disclosure relate to a particular user's behavior and/or preferences and are sorted by categories or segments depending on their relationship with the user's particular behavior and/or preferences. Hence, feature extractor 46 is capable of extracting one or more features from data 44 available locally on the user device 10. Some non-limiting examples of feature categories are: mobility, social behavior, preferences and demographic data.

The mobility category refers to the degree of regularity in a particular user's mobility pattern (e.g., number and frequency of visits to particular places). For example, data 44 could contain the user's browser history and bookmarks obtained from the user device's web browser. In addition, data 44 can contain location history obtained from a search history from mapping programs (e.g., MapQuest, Google Maps or other platform-specific programs). Location history also can be obtained from the user device' connectivity log to a cellular network access point (or other wireless networks, Bluetooth or WLAN). In addition, calendar events can be harvested from a user's profile (e.g. .pst file in MS Outlook, tasks and specific events).

The social behavior category refers to, as non-limiting examples, call patterns, the number of frequently called contacts, messaging patterns, number and frequency of Bluetooth devices observed and/or paired (as well as wifi or WLAN contacts). In addition, social behavior includes information obtained from the user device's contacts and instant messaging history from instant messaging programs (e.g., AOL, MSN, Yahoo, SMS messaging, twitter, and Facebook).

The preferences category can include ringtone/vibration usage, charging patterns, and application usage patterns. Such feature information can also be obtained from the preferences contained in other existing application on the user device (e.g., information pulled from configuration files). If available, demographic data such as age, gender, and country can be included in data 46.

Figure 3:
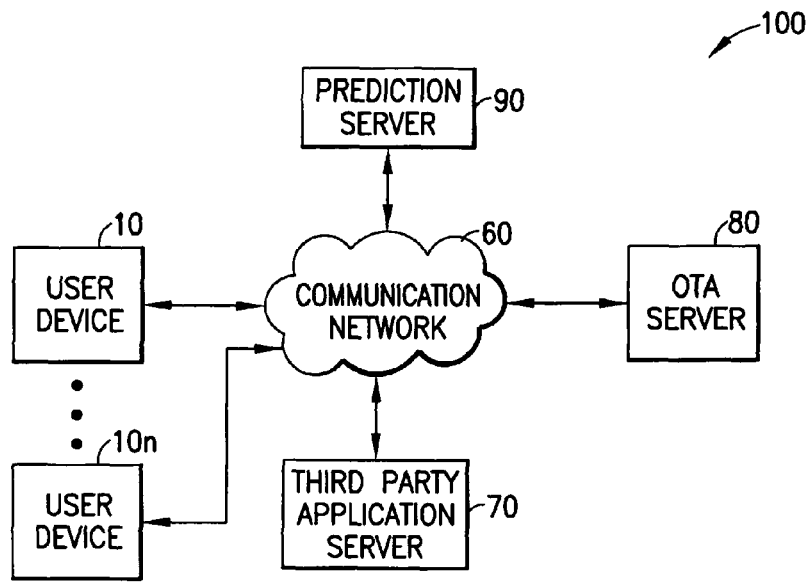
FIG. 3 depicts a system including a communication network coupled to one or more user devices, a platform server, a prediction server and third party server to allow third party application developers to tailor their applications adaptively to user preferences, behavior and habits, according to one possible exemplary embodiment of the present invention.

Referring now to FIG. 3, a system is shown for allowing third party application developers to adaptively tailor their applications to user preferences, behavior and habits 100. As shown in FIG. 3, a user device 10 is coupled to at least one communication network 60, which can be a wireless communication network. Additional user devices 10n also can be coupled to the communication network 60. Some non-limiting examples of a wireless network are a WLAN, WCDMA/LTE, UWB/60 GHz, UTRAN, GSM, BT LAN, or any other network. An over-the-air (OTA) server 80, which can be maintained by either a platform vendor or a mobile ecosystem contributor (e.g., mobile device/solution providers), is coupled to the communication network 60. In addition, a third party application server 70 is coupled to communication network 60. Finally, a prediction server 90 is coupled to the communication network 60.

Figure 4:
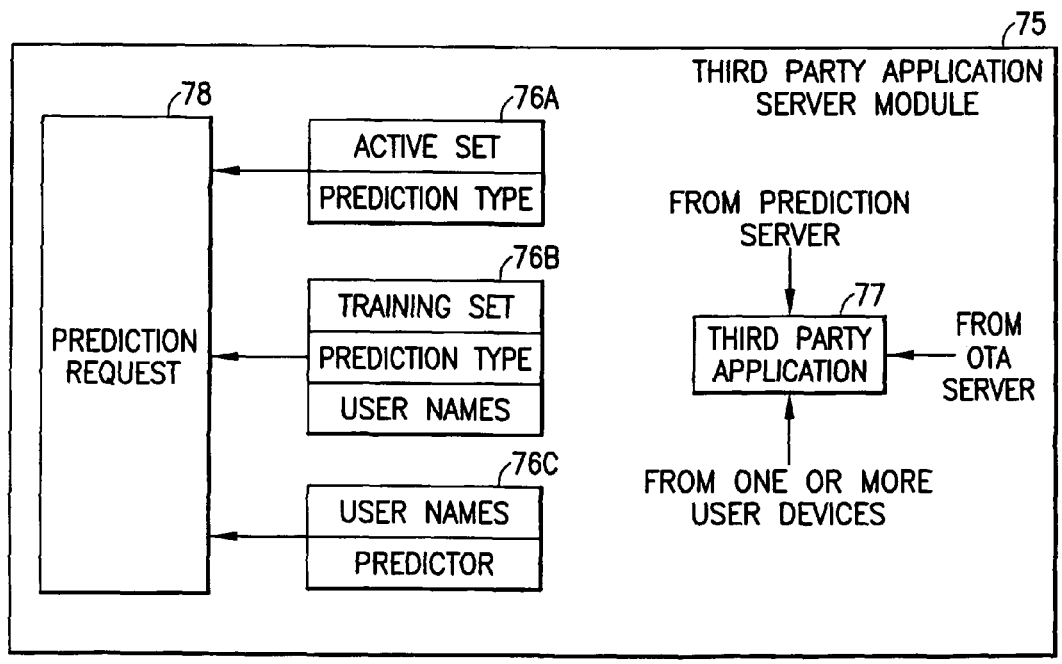
FIG. 4 is a block diagram of a third party application module including software capable of allowing third party application developers to tailor their applications adaptively to user preferences, behavior and habits, according to one possible exemplary embodiment of the present invention.

Referring now to FIG. 4, a block diagram of a third party application server module 75 is shown. The third party application server module 75 can be embodied as a memory module contained within memory of a server. The module 75 interacts with a controller and user interface and communicates via a network controller or wirelessly via a transceiver (not shown). As explained in greater detail below with respect to the method of the present invention, a third party developer wishing to utilize the prediction services of the present invention will first transmit a prediction request 78 to either the OTA server 80 or the user device 10. The prediction request 78 will initially contain an active set of usernames to initially train and construct a predictor, as well as a prediction type 76A. The prediction type designates the calculation to be performed on the features extracted from the user profiles. Subsequently, a second prediction request and, if applicable, additional prediction requests will be transmitted to the prediction server 90 containing a training set, a prediction type and usernames 76B. In other words, the UPVs and training set are uploaded to the prediction server which in response returns a score to the third party application server module 75. Basically, a third party application developer can add more users to provide a more statistically sound sampling of potential users. As a result of a subsequent prediction request, a new predictor is generated by the prediction server 90. Additionally, after the program is released, new usernames can be submitted with the previously calculated predictor to update the predictor 76C.

When installed on a user's device, the third-party application can request a score prediction through the dedicated prediction API 49. This invokes the previously trained predictor to compute a score based on a locally-stored individual profile vector (IPV) and a UPV which are combined by the user device. Therefore, the application obtains the predicted score as a result of its query. In this way, the application can improve its usability/user experience based on the user's profile information without the prediction server 90 directly accessing this information.

Additionally, the application might get explicit or implicit ratings for its items from the user, as the user uses the application. In this case, the application can optionally communicate these ratings to the server through a dedicated prediction API call. This allows the device to upload this new information to the server, which will add it to the training set. When a sufficient number of new ratings are collected, the server can adjust its predictor in order to improve the performance of the service with respect to that particular application.

Figure 5:
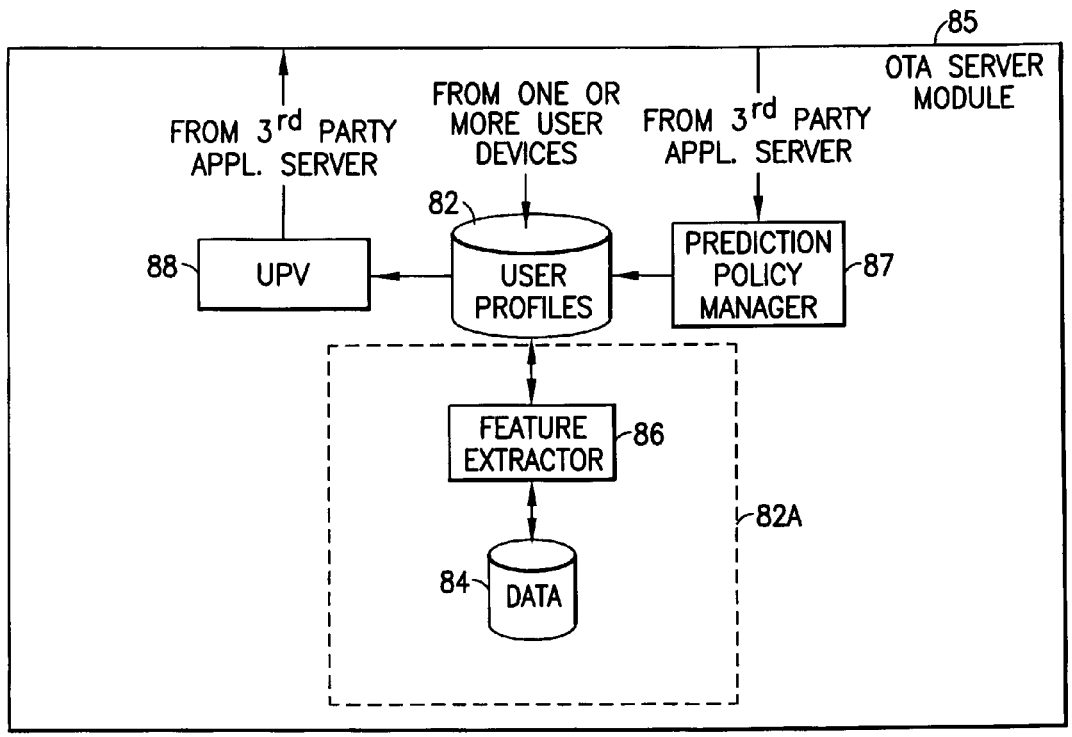
FIG. 5 is a block diagram of an OTA server module including software capable of allowing third party application developers to tailor their applications adaptively to user preferences, behavior and habits, according to one possible exemplary embodiment of the present invention.

Referring now to both FIGS. 2 and 5, the prediction request sent from the third party application developer is either received by a prediction policy manger on either a user device (such as user device 10 or an OTA server such as the OTA server 80). The prediction policy manager shown in user device 10 (47) or OTA server 80 (87) are configured to provide a level of security to protect the privacy of user data. In other words, policies are created (as well as usernames and passwords) for each third party developer based upon a subscription or other pre-authorization agreement between each mobile platform vendor or mobile ecosystem contributor and each third party application developer. To ensure user privacy, the prediction server 90 returns only prediction results as a response to prediction requests. As an additional mechanism to ensure user privacy, the prediction server 90 also has prediction calculation policies determining what kind of requests are allowed with respect to different third party applications. Some non-limiting examples of these policies are as follows: (1) Applications can be limited to allow requests for prediction/relevance calculation to those segments of the user profile which are needed from the perspective of a particular application. (e.g., a weather application cannot make requests related to purchase habits of the user.) Therefore, the third party application developer cannot reconstruct user profiles by continuous generic relevance calculation requests if the requests are not needed to adapt the application itself. (2) The number and frequency of requests can be limited for the same reason (e.g., not to allow reconstruction of the user profile for the applications). (3) Third party application developers can be restricted from direct access to the user device or the mobile platform vendor or mobile ecosystem contributor (e.g., the OTA server 80). The above subscription (or other pre-authorization) agreement would dictate whether the third party application can access the user device 10 or OTA server 85.

FIG. 2 shows one possible embodiment of the present invention where the prediction policy manager 47 is located in one or more user devices such as user device 10. As shown in FIG. 2, the user device 10 receives a prediction request from a third party application developer. For simplicity, the operation of one user device is described herein, however this embodiment can include hundreds of thousands of devices (or millions). If the prediction request is authorized by a policy contained in the prediction policy manager 47, the prediction request is forwarded to the user profile 42 which contains the features extracted by the feature extractor 46. An individual profile vector (IPV) 48 is generated and transmitted to OTA server 80 together with a prediction type. In another embodiment of the present invention, the user can have direct access to the predictive server via a predictive API 49. Hence, the user device 10 can transmit the IPV to the prediction server 90 rather than the user profile 42 which contains the user's confidential personal identifying information.

Alternatively, FIG. 5 shows another embodiment of the present invention where the prediction policy manger 87 is in located in the OTA server 80 and receives a prediction request from a third party application developer as indicated in the OTA server module 85. The OTA server module is a memory module contained within the memory of a server. The module interacts with a controller and user interface and communicates via a network controller or wirelessly via a transceiver (not shown). If the prediction request is authorized by a policy contained in the prediction policy manager 87, the prediction request is forwarded to the user profiles database 82. The user profiles database 82 can obtain features from hundreds of thousands (or millions) of individual user devices such as user device 10 (e.g., IPV 48 containing features extracted by the feature extractor 46 which were previously uploaded to the OTA server 70). Alternatively, the OTA server 80 can conduct its own data mining operation 82A where features relate to user behavior and/or preferences are obtained from data maintained on the OTA server 80. For example, communications logs or other user-specific information from billing records or browser histories can be exploited for this data. Accordingly, feature extractor 86 would extract this data from a database 84 containing this information. A universal profile vector (UPV) 88 is thereafter generated from the user profiles 82 and transmitted to the prediction server 90 together with a prediction type. In other words, user profiles containing private personal information of users of the mobile platform or server are not transmitted to the predictive server 90.

Figure 6:
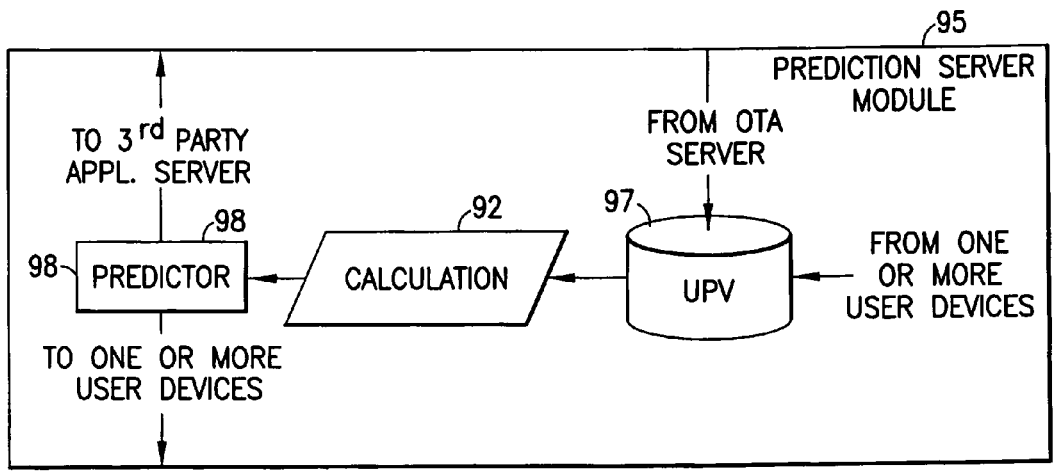
FIG. 6 is a block diagram of a prediction server module including software capable of allowing third party application developers to tailor their applications adaptively to user preferences, behavior and habits, according to one possible exemplary embodiment of the present invention.

Referring now to FIG. 6, a prediction server module 95 is shown according to one possible embodiment of the present invention. The prediction server module 85 can be embodied as a memory module contained within memory of a server and interacts with a controller and user interface and communicates via a network controller or wirelessly via a transceiver (not shown). As shown in FIG. 6, the prediction server 90 receives a plurality of IPV 48 from one or more user devices (such as user device 10) via a predictive API 49 as shown in FIG. 2. Alternatively, the prediction server 90 receives a UPV 88 from OTA server 80. The collected IPVs and UPVs are placed in a UPV database 97. Additional data can be combined with the UPVs in UPV from other data sources. For example, data linked to specific usernames can be harvested from various commercial information providers which were likely complied from a user's prior interaction via surveys and/or interviews. The prediction server 90 performs a calculation 92 on the IPVs or the UPV contained in the UPV database 97 and outputs extrapolated data referred to as a predictor 98. The calculation is a statistical analysis of the data including, but not limited to, various inferential statistics methods including correlation, means testing, and regression analysis. The output of the calculation could be a structured induction score including a transition model for a specific user or group of users, a data summarization including descriptive statistics of the specific user or group of users to indicate a classifier, a probability estimation including classification, similarity measurements, regression analysis scoring, or ranking.

The predicator 98 is transmitted to the third party application 70 or one or more user devices such as user device 10. Referring back to FIG. 4, the third party application server 70 receives the predictor and incorporates that data into a third party application 77 which includes user preferences, behavior and habits particular to a username. However, no sensitive personal information has been released to the third party application developer. Nor has mobile platform owner or mobile contributor relinquished control over their data assets (user profiles) to a third party application developer or a predictive server. Although not desirable, other embodiments of the present invention can utilize raw data including sensitive personal information and can reveal user asset to a third party application developer or a predictive server.

The prediction server 90 can collect user profiles (to the extent allowed by the users). Its purpose is to compute a score for each user/item pair. The list of items is specific to each third-party application using the service. The training phase occurs when a new third-party application registers to the service. The third-party developer needs to provide a list of items and a training set, which consist of a sufficiently dense rating matrix of the items for a subset of users. The prediction server 90 uses this matrix to train a predictor, which predicts the score from the user profiles (or from the segments of user profile that are allowed for the application in question). After calculating the predictor, its learned parameters can be either stored on the server or pushed to the mobile devices which have the third-party application installed (or transmitted back to a third party application server).

The present invention also includes an updating function which would occur after the third party application is released. Referring back to FIG. 2, the user profile 42 can interact with OTA server 80 to periodically update its user profiles database 82 to include an updated IPV to allow the OTA to create an updated UPV 88. For example this could occur every 60 days or whatever other time period would be practical. The OTA server would in turn transmit the updated UPV to the prediction server.

Referring now to FIG. 6, the prediction server 90 receives the updated UPV, stores the data in the UPV database 97 and conducts a calculation 92 on the UPV data, thereby generating an updated predictor 98. The updated predictor 98 is the transmitted to the third party application server 70. Subsequent updates that are directly transmitted to the user device (such as user device 10) can be provided via the predictive API 49 as shown in FIG. 2. These updates incorporate changes to the application which include updated information related to user preferences, behavior and habits particular to a username (e.g., a software update).

Figure 7:
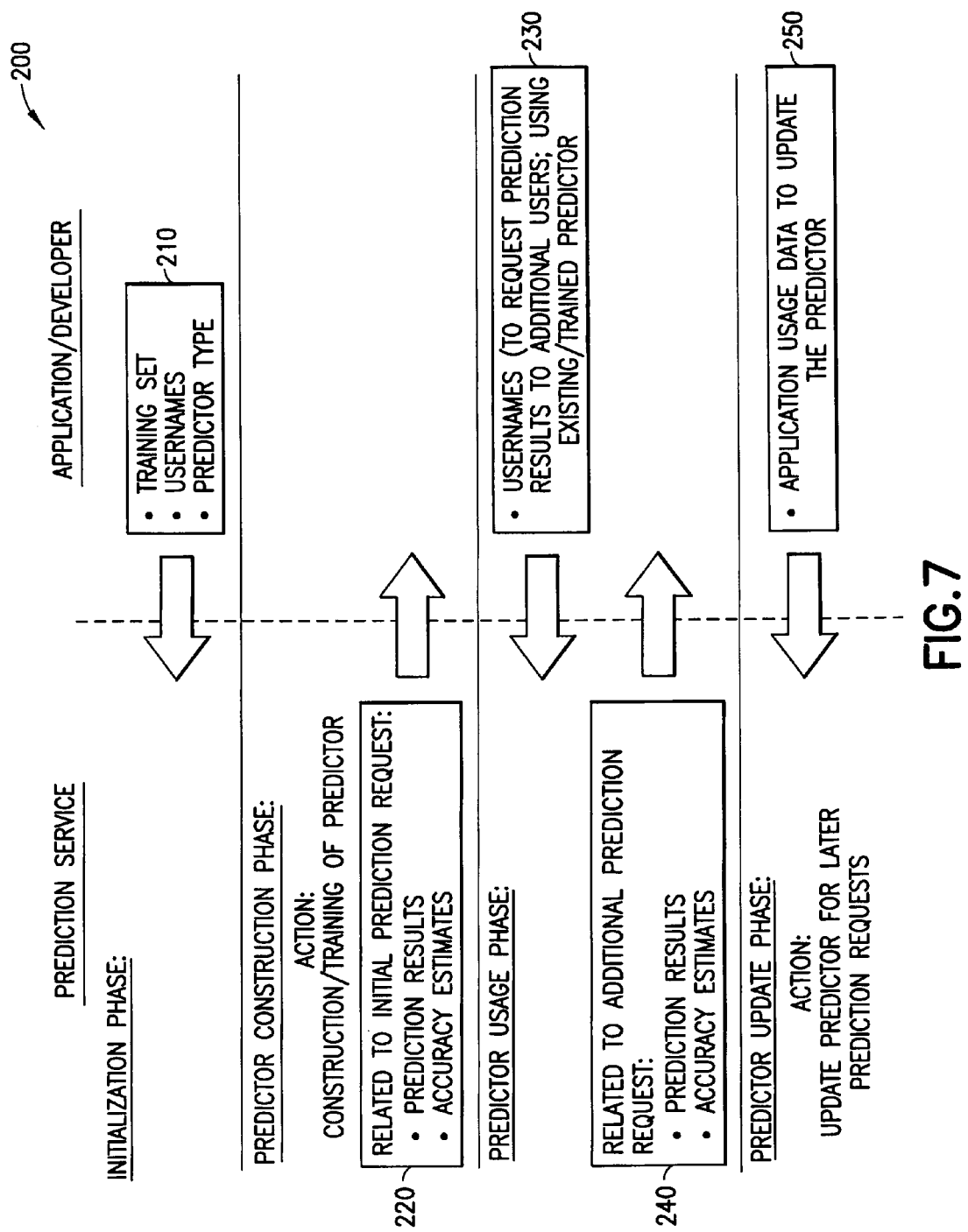
FIG. 7 is a logic flow diagram that illustrates the method and execution of computer program instructions embodied on a computer readable medium, to allow third party application developers to tailor their applications adaptively to user preferences, behavior and habits in accordance with the exemplary embodiments of this invention.

Referring now to FIG. 7, the method of allowing third party application developers to tailor their applications adaptively to user preferences, behavior and habits will now be described. As noted above, this disclosure provides several non-limiting examples of apparatus, methods and computer programs implemented in mobile devices and/or wireless networks. Other embodiments are possible, such additional non-limiting examples may also include implementation in conjunction with a computer application (e.g. a "plug-in") and/or an enhancement to internet service (e.g. configuration of a set top box or cable/DSL modem to user preferences) or any other way a consumer can interact or provide electronic data to providers of a prediction service, both for data collection and usage of the prediction service.

As shown in FIG. 7, four separate phases are shown for predicting user preferences, behavior and habits: an initial phase prediction, predictor construction phase, predictor usage phase and a predictor update phase. Initially, the first step in the method of the present invention provides that the application developer send a prediction request 210 (including a training set, usernames and a predictor type) to a prediction service.

The prediction service includes two possible embodiments utilizing either the combination of one or more user devices such as user device 10 and prediction server 90 in FIG. 6, or the OTA server 80 and prediction server 90. Accordingly, in one possible embodiment, the method of the present invention includes the further steps of extracting features from the databases of a plurality of user devices to generate a universal profile vector (UPV) and transmitting the UPV to a prediction server. Alternatively, in one possible embodiment, the method of the present invention includes the further steps of extracting features from a database of an OTA server to generate a universal profile vector (UPV) and transmitting the UPV to a prediction server. The prediction server 90 constructs an initial prediction result and estimate of accuracy of the prediction result 220. The predicted results and accuracy estimates are transmitted back to the third party application developers who incorporate the extrapolated data into the application to adapt the application to user preferences, behavior and habits particular to a username.

The method of the present invention includes a subsequent step of adding usernames to the existing prediction result and/or changes in existing user use of features 230. This step includes existing/trained predictors in the calculation. In response to the adding of user profiles or updated user profiles, an updated prediction result is generated, as well as estimation of accuracy is transmitted to the third party application developer 240.

The method of the present invention also provides for subsequent periodic updates after the third party application is released and is in use by user devices. In this further step, application usage data is updated to the prediction service 250.

Figure 8A:
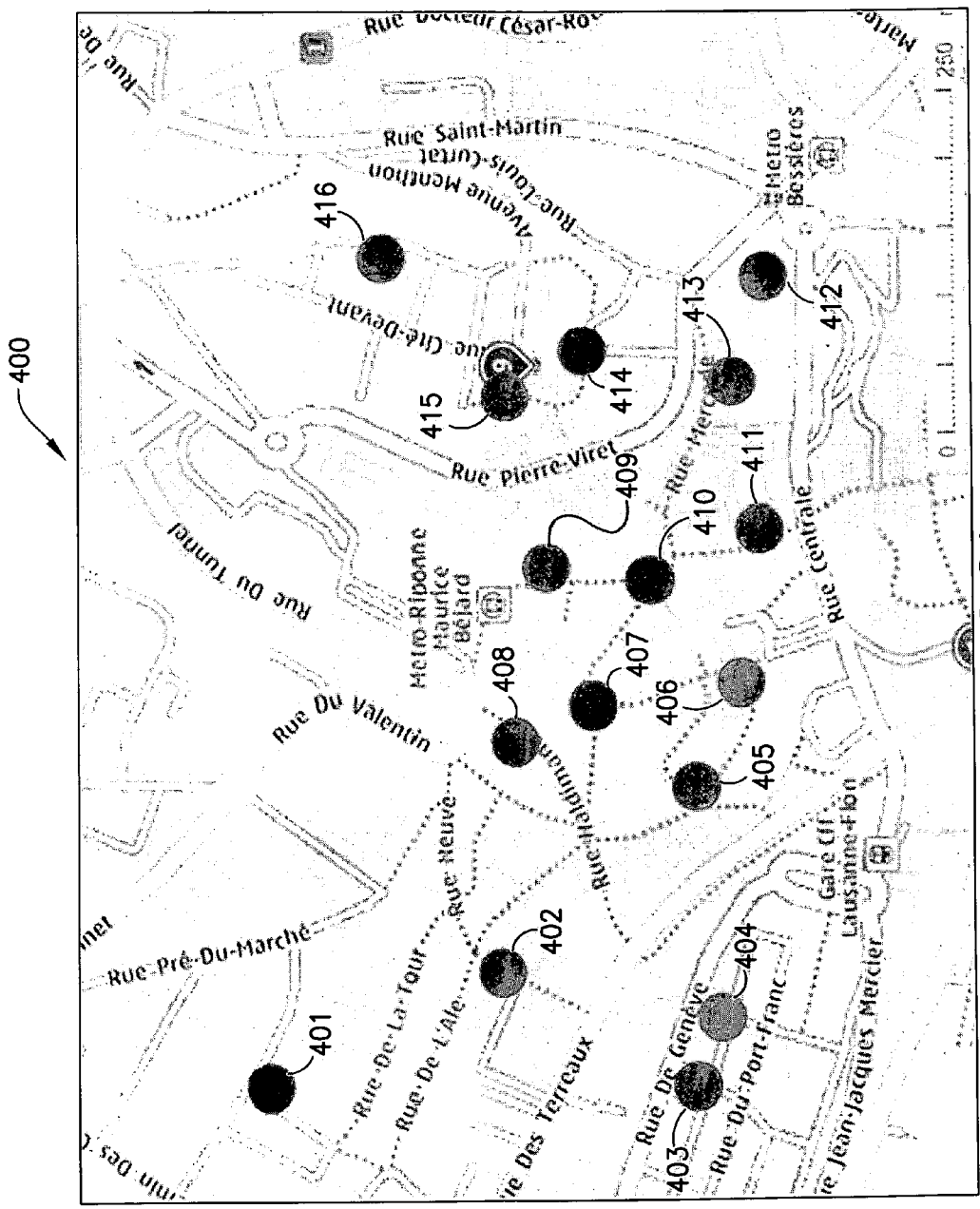
FIG. 8A depicts a user interface of a localized map program rendering an image of the city of Lausanne, Switzerland showing a variety of events available for a holiday traveler.
Figure 8B:
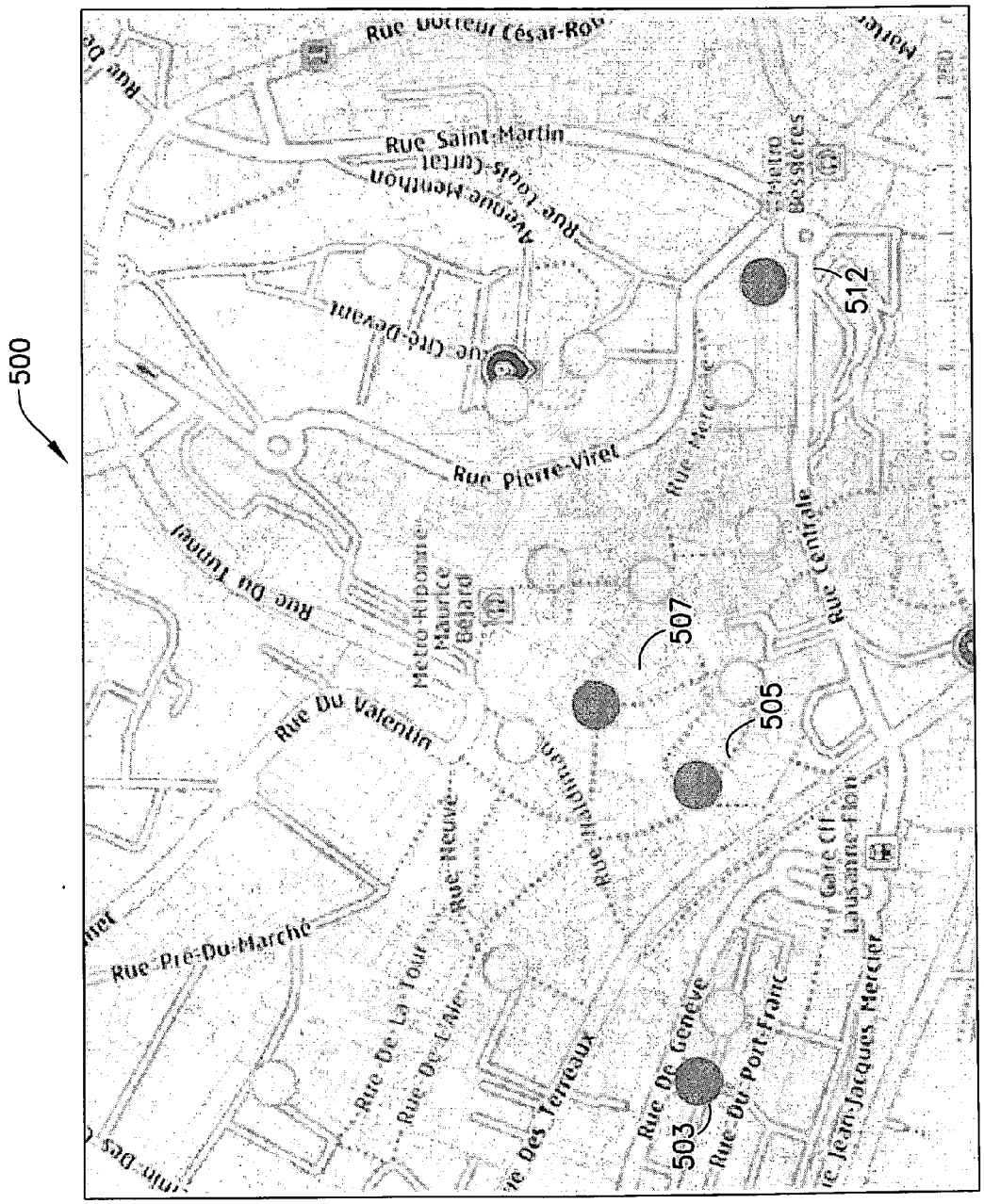
FIG. 8B depicts a user interface of a localized map program rendering an image of the city of Lausanne, Switzerland showing a subset of events available for the holiday traveler based upon a user preferences, behavior and habits in accordance with the exemplary embodiments of this invention.

One possible implementation of the above described apparatus, method or computer program device is shown in FIGS. 8A and 8B. Both figures depict a user interface of a localized map application for the city of Lausanne, Switzerland which employs the apparatus, method and computer program device of the present invention. In FIG. 8A a tourist or business traveler planning a trip to the city of Lausanne, Switzerland downloads this localized map application which includes a predictive API according to one embodiment of the present invention. As shown in the user interface 400, various restaurants 407, 408, 409, 410, 416 and hotels 401, 405, 411 are highlighted. Also, a variety of sightseeing locations are shown such as 402, 403, 413, and 414. In addition, the relevant data shown in user interface 400 includes a gym 412 and a boutique 404. The various establishments, events and attractions are surrounded by mass transit hubs such as the Lausanne Metro, a light rail rapid transit system called the Lausanne Metro and the Metro Riponne, a rail station.

Next, as shown in the user interface 500 of FIG. 8B, the localized map application accesses the user's IPV which together with a preexisting predictor computes a score based upon the locally-stored data. Therefore, the application adapts to user preferences, behavior and habits. As shown in FIG. 8B, the user's choices are now limited to his or her preferences, behavior and habits. For example, the predictor revealed that the user would: prefer a hotel 505 close to a light rail station, typically eat at an Italian-style restaurant 507, would visit a gym 512 close to the light rail and might be interested in visiting an art museum 503.

Figure 9:
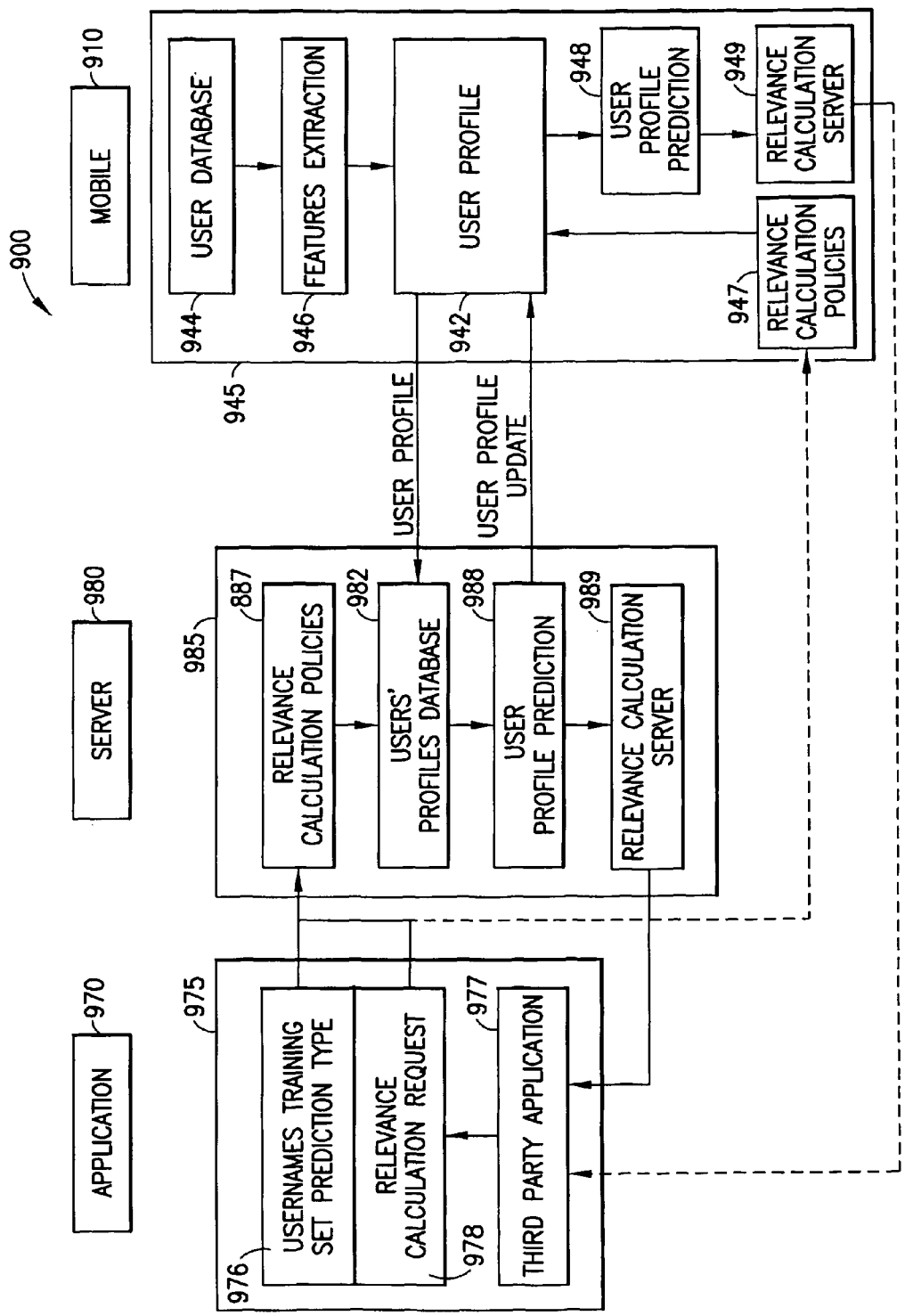
FIG. 9 is a process diagram of a system capable of allowing third party application developers to tailor their applications adaptively to user preferences, behavior and habits, according to one possible exemplary embodiment of the present invention.

Referring now to FIG. 9, a process diagram is shown of a system capable of allowing third party application developers to tailor their applications adaptively to user preferences, behavior and habits, according to one possible exemplary embodiment of the present invention. The process depicts the interaction an application 970, a server 980 and mobile user equipment 910. The application 970 includes an application module 975 which transmits relevance calculation request 978 based upon usernames, training set and a prediction type 976. The application module 975 can transmit a relevance calculation request 978 to server 980 as indicated by the solid arrow or mobile user equipment 910 as indicated by the dashed arrow. A server module 985 receives the request and first checks its relevance calculation policies 987 to determine if the request is authorized. If the request is authorized then server module 985 forwards the request to the user's profile database 982 which contains information on individual user preferences, habits and behavior (extracted locally or from one or more mobile user equipment). To protect the privacy of individual users a uniform profile vector (UPV) is generated based upon the third party request and information extracted from user's profiles database 982 and referred to as a user profile prediction 988. The UPV is forwarded to a relevance calculation server 989 which can conduct a statistical analysis of the UPV and return the results to the application module 975.

Similarly, application module 975 can transmit a request to the mobile user equipment 945. The request is first authenticated against relevance calculation policies 947. If the third party is authorized, the request is forwarded to the user profile 942. The user profile contains information relevant to the user's preferences, habits and behavior which are extracted by a feature extraction 946 from a user database 944. To protect the privacy of individual users an individual profile vector (IPV) is generated based upon the third party request and information extracted from user's profiles database 942 and referred to as a user profile prediction 948. The IPV is forwarded to a relevance calculation server 949 which can conduct a statistical analysis of the UPV and return the results to the application module 949.

An alternative embodiment can provide that mobile device 910 can upload IPV 942 to server database 982 for UPV calculations. In addition, server 980 may store histories of IPVs in the server's memory (not shown) for later predication analysis. This embodiment would relax the memory requirements at the mobile device 910. If an application request 947 is received by mobile device 910, a further request may be made to server 980 for missing/additional information to form user individual profile prediction. Another embodiment could require that the prediction request 947 be redirected to server 980 based upon various local metrics which would prevention burdening the mobile device (e.g. time to perform prediction task or power consumed during process).

Based on the foregoing it should be apparent that the exemplary embodiments of this invention provide a method, apparatus and computer program(s) to allow third party application developers to tailor their applications adaptively to user preferences, behavior and habits. The present invention achieves benefits for all actors in a wireless ecosystem: the user, the mobile platform provider/mobile ecosystem contributor and the third party application developer.

User Perspective:

User experiences are becoming more contextual, and it is increasingly important that mobile applications and experiences be tailored adaptively to user preferences, behavior and habits. Ideally, this will happen immediately after the user has begun to use a new application, without any long training/adaptation periods. On the other hand, end users are not willing to manually answer detailed and time-consuming profiling questionnaires before they start to use new applications. Furthermore, all personalization requires that the user reveal sensitive details from his life to enable individual adaptation. This invention, as described above, allows third party application developers to obtain user-specific information in a manner that maintains the user's privacy (i.e., in a manner that prevents release of user-related information, such as the user's profile, to third party developers). Furthermore, users also can control the requests that third party developers are allowed to submit to the prediction/relevance server of the system. Therefore, this invention allows third party applications to benefit from the end-user data, even though the user would not consider the third party developers behind the applications trustworthy enough to directly provide detailed personal information to them.

Hence, this invention provides for quick personalization of the application experience without revealing personal user (profile) data to third party developers and without imposing upon the end user the burden of dealing with manual profiling questionnaires.

Mobile Platform Provider/Mobile Ecosystem Contributor Perspective:

In order to attract third party developers to create applications for a particular platform, the platforms should offer attractive APIs for external third party developers. If such APIs are offered, the wireless ecosystem will contain a rich set of applications. Due to strong competition between mobile ecosystems, it is important for the developer to exploit all viable opportunities to differentiate its product(s) from those of its competitors. The above-described invention provides an interface which allows improved and immediate user-specific adaptation of the applications by the external third party developers—which therefore improves platform's competitiveness. Further, this invention utilizes data assets in the hands of the mobile platform providers/ecosystem contributors in a way that allows them to keep full control on their assets without revealing the data itself to the third parties.

Hence, this invention provides an improved developer experience (by offering prediction service), without sacrificing control of their data assets or end user privacy.

Third Party Application Provider Perspective:

The above described invention is an improvement over the prior art in that it eliminates training periods during which adaptation of application typically occurs. The application experience during the first days/weeks of usage is critical, because during that period the user decides whether he or she wants to become a permanent user of the application. This invention enables immediate personalization/adaptation of the application based on user profile/preferences. That improves the early-phase user experience and therefore early-phase retention from the developer's point of view. Alternatively, third party developers could collect basic profile information by manual questionnaires, but this imposes an additional burden upon the application users. Furthermore, that is a burden that is imposed before the users start to use the application, and it also is a burden that raises privacy concerns. A third party also could use the invention for tasks beyond the application/service personalization/adaptation (e.g., in planning their marketing campaigns, driving product creation and even in creating their overall strategies by estimating their userbase's characteristics based upon the characteristics of a sample of the userbase).

Hence, the present invention supports customer retention (which is critical in early phases of the application usage) by providing personalized experience to the end users—without burdening them with the profiling questionnaires.

In general, the various exemplary embodiments may be implemented in hardware or special purpose circuits, software, logic or any combination thereof Some aspects may be implemented in hardware, while other aspects may be implemented in firmware or software which may be executed by a controller, microprocessor or other computing device, although the invention is not limited in such a manner. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine (e.g., by a processor, by a processor of the machine) for performing operations. The operations comprise steps of utilizing the exemplary embodiments or steps of the method.

The various blocks shown in FIGS. 2-7 and 9 may be viewed as method steps, as operations that result from operation of computer program code and/or as one or more coupled components (e.g., function blocks, circuits, integrated circuits, logic circuit elements) constructed to carry out the associated function(s). The blocks also may be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 2-7 and 9 should be considered merely exemplary and non-limiting. It should be appreciated that the blocks may correspond to one or more functions and/or operations that may be performed in any order (i.e., any practicable, suitable and/or feasible order) and/or concurrently (i.e., in any practicable, suitable and/or feasible manner) so as to implement one or more of the exemplary embodiments of the invention. In addition, one or more additional steps, functions and/or operations may be utilized in conjunction with those illustrated in FIGS. 2-7 and 9 so as to implement one or more further exemplary embodiments of the invention, such as those described in further detail herein.

That is, the non-limiting, exemplary embodiments of the invention shown in FIGS. 2-7 and 9 may be implemented, practiced or utilized in conjunction with one or more further aspects of the invention in any combination (i.e., any combination that is practicable, suitable and/or feasible) and are not limited only to the blocks, steps, functions and/or operations illustrated in FIGS. 2-7 and 9.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited in such a manner. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:

sending a prediction request to a prediction service to construct a prediction result;

receiving a constructed prediction result and an estimation of accuracy of the prediction result; and configuring an application to adapt to at least one of user preferences, behavior and habits based upon the prediction result and estimation of accuracy of the prediction result;

wherein the prediction request includes a plurality of uniform profile vectors that are used to protect a user's privacy and sensitive personal information, which are created by extracting features from databases of a plurality of user devices, and wherein the profile vectors are computed locally on an electronic device based upon usage and/or context data gathered on the device itself.

2. The method of claim 1, wherein the prediction service is comprised of an over-the-air server which is coupled to a prediction server.

3. The method of claim 1, wherein the prediction service is comprised of a dedicated API residing on one or more user devices and configured to access a prediction server.

4. The method of claim 1, wherein the prediction request further comprises:
a training set corresponding to a subset of a plurality of uniform profile vectors usernames, and a designation of a predictor-type.

5. The method of claim 4, wherein the predictor-type comprises:
a structured induction score including a transition model for a specific user or group of users;
a data summarization including descriptive statistics of the specific user or group of users to indicate a classifier; and
a probability estimation including classification, similarity measurements, regression analysis scoring, or ranking.

6. The method of claim 1, wherein the extracted features comprises the user's preferences, behavior and habits and comprise:
a mobility category;
a social behavior category;
a preferences category; and
a demographic data category.

7. The method of claim 1, further comprising:
sending a prediction usage request to the prediction service to construct a prediction usage result;
receiving a prediction usage result and an estimation of accuracy of the prediction usage result; and
configuring the application to adapt to the user preferences, behavior and habits based upon the prediction usage result and estimation of accuracy of the prediction usage result.

8. The method of claim 1, further comprising:
sending a prediction update request to the prediction service to construct a prediction update result;
receiving a prediction update result and an estimation of accuracy of the prediction update result; and
configuring the application to adapt to the user preferences, behavior and habits based upon the prediction update result and estimation of accuracy of the prediction update result.

9. The method of claim 1, further comprising limiting access to a user data to conduct requests for prediction calculation or relevance calculation.

10. The method of claim 9, wherein a requester is limited to those segments of a user profile which are needed from the perspective of a particular application.

11. The method of claim 9, wherein a requester is limited in number and frequency of requests for prediction calculation or relevance calculation.

12. The method of claim 9, wherein a requester is restricted from direct access to a user device or a mobile platform vendor or mobile ecosystem contributor.

13. A non-transitory computer-readable medium that contains software program instructions, where execution of the software program instructions by at least one data processor results in the performance of operations that comprise execution of the method of claim 1.

14. An apparatus comprising a processor and a memory including computer program code, wherein the memory and the computer program code are configured, with the processor, to cause the apparatus to perform at least:
sending a prediction request to a prediction service to construct a prediction result;
receiving a constructed prediction result and an estimation of accuracy of the prediction result; and
configuring an application to adapt to at least one of user preferences, behavior and habits based upon the prediction result and estimation of accuracy of the prediction result;
wherein the prediction request includes a plurality of uniform profile vectors that are used to protect a user's privacy and sensitive personal information, which are created by extracting features from databases of a plurality of user devices, and wherein the profile vectors are computed locally on an electronic device based upon usage and/or context data gathered on the device itself.

15. The apparatus of claim 14, wherein, the apparatus is a mobile device such as a smart phone, tablet or portable computer.

16. The apparatus of claim 14, wherein, the apparatus is over the air server connected to a communication network.

17. The apparatus of claim 14, wherein, the apparatus is a set-top box connected to a cable, Internet or satellite telecommunication network.

18. The apparatus of claim 14, wherein, the apparatus is a standalone device capable of connecting to a telecommunication network.

19. An apparatus comprising a processor and a memory including computer program code, wherein the memory and the computer program code are configured, with the processor, to cause the apparatus to perform at least:
receiving one or more prediction requests from one or more third parties;
calculating a prediction result based on the received prediction request and an estimation of accuracy of the prediction result; and
sending the prediction result and the estimation of accuracy to third party to enable the third party to configure an application to adapt to at least one of user preferences, behavior and habits based upon the prediction result and estimation of accuracy of the prediction result;
wherein the prediction request includes a plurality of uniform profile vectors that are used to protect a user's privacy and sensitive personal information, which are created by extracting features from databases of a plurality of user devices, and wherein the profile vectors are computed locally on an electronic device based upon usage and/or context data gathered on the device itself.

* * * * *